US012595002B2

(12) United States Patent
Coupe et al.

(10) Patent No.: US 12,595,002 B2
(45) Date of Patent: Apr. 7, 2026

(54) VEHICLE CROSSMEMBER, VEHICLE COMPRISING SUCH A VEHICLE CROSSMEMBER, AND SET OF VEHICLE CROSSMEMBERS

(71) Applicant: FAURECIA INTERIEUR INDUSTRIE, Nanterre (FR)

(72) Inventors: Christophe Coupe, Crillon (FR); Mickael Trannoy, Cauvigny (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 379 days.

(21) Appl. No.: 18/325,796

(22) Filed: May 30, 2023

(65) Prior Publication Data
US 2023/0382465 A1 Nov. 30, 2023

(30) Foreign Application Priority Data

May 30, 2022 (FR) ...................................... 2205135

(51) Int. Cl.
*B62D 25/14* (2006.01)
*B62D 29/00* (2006.01)

(52) U.S. Cl.
CPC ......... *B62D 25/145* (2013.01); *B62D 29/004* (2013.01)

(58) Field of Classification Search
CPC ............................ B62D 25/145; B62D 25/147
USPC .................................................... 296/193.02
See application file for complete search history.

(56) References Cited

U.S. PATENT DOCUMENTS

| | | | | |
|---|---|---|---|---|
| 5,868,426 A * | 2/1999 | Edwards | .............. | B62D 25/147 296/203.02 |
| 6,988,764 B2 * | 1/2006 | Matsutani | ............ | B62D 25/142 296/70 |
| 7,303,714 B2 * | 12/2007 | Matsuzaki | ........ | B29C 45/14598 264/328.12 |
| 7,458,625 B2 * | 12/2008 | Kimura | ................ | B62D 25/145 296/70 |
| 8,801,087 B2 * | 8/2014 | Kim | ..................... | B62D 25/145 296/29 |
| 8,939,497 B2 * | 1/2015 | Baudart | ............... | B62D 25/147 296/193.02 |
| 8,974,136 B2 * | 3/2015 | Kasper | ................... | B62D 27/02 296/205 |
| 8,985,679 B2 * | 3/2015 | Da Costa Pito | ..... | B62D 25/145 296/70 |
| 10,363,963 B2 * | 7/2019 | Someya | ................. | B62D 21/15 |

(Continued)

FOREIGN PATENT DOCUMENTS

| | | |
|---|---|---|
| CN | 104002753 A | 8/2014 |
| DE | 10003981 A1 | 8/2001 |

(Continued)

OTHER PUBLICATIONS

German Search Report corresponding to application 102023113890. 1, dated Jan. 20, 2024, 20 pages.

*Primary Examiner* — Jason S Morrow
(74) *Attorney, Agent, or Firm* — Reising Ethington P.C.

(57) ABSTRACT

A vehicle crossmember extends in a longitudinal direction and includes a first portion having a first portion tube made of metal, and a second portion having a body made of plastic. A coupling end of the second portion has a second portion tube made of metal, overmolded by the body, and the first portion tube is welded to the second portion tube.

16 Claims, 4 Drawing Sheets

(56)  References Cited

U.S. PATENT DOCUMENTS

| | | | | |
|---|---|---|---|---|
| 10,377,427 | B2* | 8/2019 | Mori | B62D 29/001 |
| 11,072,373 | B2* | 7/2021 | Hashimura | B62D 1/16 |
| 11,407,454 | B2* | 8/2022 | Guerreiro | B29C 45/14786 |
| 11,623,694 | B2* | 4/2023 | Choi | B62D 25/081 |
| | | | | 296/187.03 |
| 12,024,231 | B2* | 7/2024 | Zhang | B62D 25/145 |
| 2002/0153750 | A1 | 10/2002 | Feith | |
| 2004/0135400 | A1 | 7/2004 | Matsuzaki et al. | |
| 2005/0001450 | A1* | 1/2005 | Cooper | B62D 25/145 |
| | | | | 296/193.02 |
| 2009/0152898 | A1 | 6/2009 | Kawamura et al. | |
| 2012/0273539 | A1* | 11/2012 | Carter | B62D 25/145 |
| | | | | 224/545 |
| 2014/0103685 | A1* | 4/2014 | Mani | B62D 25/145 |
| | | | | 29/897.2 |
| 2015/0056428 | A1 | 2/2015 | Birka | |
| 2017/0120956 | A1 | 5/2017 | Trannoy et al. | |
| 2023/0415821 | A1* | 12/2023 | Coupe | B62D 29/001 |
| 2024/0034413 | A1* | 2/2024 | Martin | B62D 29/005 |
| 2024/0091997 | A1* | 3/2024 | Zhang | B29C 45/1705 |
| 2025/0083750 | A1* | 3/2025 | Neul | B62D 25/145 |
| 2025/0145209 | A1* | 5/2025 | Kong | B62D 29/004 |

FOREIGN PATENT DOCUMENTS

| | | | |
|---|---|---|---|
| DE | 10010709 | C1 | 8/2001 |
| DE | 10045347 | A1 | 3/2002 |
| DE | 102010014533 | A1 | 10/2011 |
| DE | 102011101581 | A1 | 11/2012 |
| DE | 102016207765 | A1 | 11/2017 |
| FR | 3006393 | A1 | 12/2014 |
| FR | 3043050 | A1 | 5/2017 |
| KR | 20210141255 | A | 11/2021 |

* cited by examiner

VEHICLE CROSSMEMBER, VEHICLE COMPRISING SUCH A VEHICLE CROSSMEMBER, AND SET OF VEHICLE CROSSMEMBERS

TECHNICAL FIELD

This invention relates to vehicle crossmembers, in particular to crossmembers of a motor vehicle dashboard. More particularly, this invention relates to vehicle dashboard crossmembers comprising at least two portions.

BACKGROUND

There are known vehicle dashboard crossmembers extending in a longitudinal direction and including:
  a first portion comprising a first portion tube made of metal, said first portion extending in the longitudinal direction towards a first coupling end,
  a second portion comprising a body made of plastic, said second portion extending in the longitudinal direction from a second coupling end, the second coupling end being suitable for securing to the first coupling end.

The two portions are therefore made substantially of two different materials. In particular, the first portion is made, for example, of metal in order to preserve great rigidity in this first portion, this first portion usually being used for attaching the vehicle's steering column. The second portion is made for example of plastic in order to lighten this second portion located under the vehicle dashboard, and to reduce its cost.

Document FR 3 043 050 shows such a vehicle dashboard crossmember in which a coupling part of the second portion is fitted into the first portion so that the first portion and second portion are connected together.

SUMMARY

The present invention aims to improve the construction of dashboard crossmembers of this type, in particular to improve the connection between the first portion and the second portion.

To this end, a first object of the invention relates to a vehicle crossmember of the aforementioned type wherein the second coupling end comprises a second portion tube made of metal, said second portion tube being overmolded by a part of the body such that the second portion tube is integral with said body, and the first coupling end of the first portion tube is welded to the second portion tube so that the first and second portions are integral with each other.

These arrangements ensure that the first portion is very rigidly secured to the second portion against various bending and/or torque and/or traction/compression stresses.

In addition, the first and second portions thus have mechanical characteristics optimized for their respective functions.

In various embodiments of the vehicle crossmember according to the invention, recourse may possibly also be made to one or more of the following arrangements.

According to one aspect, the weld between the first portion tube and the second portion tube is a continuous weld that surrounds the periphery of said first and second portion tubes.

According to one aspect, the weld between the first portion tube and the second portion tube is a weld in the form of line segments or dots distributed around the periphery of said first and second portion tubes.

According to one aspect, the second portion tube comprises a first area over which the part of the body is molded, and this first area comprises holes which are entered by the material of the part of the body.

According to one aspect, the holes are elongate in a predetermined direction.

According to one aspect, the second portion tube comprises a first area over which the part of the body is molded, and this first area comprises texturing on its outer surface covered by the material of the part of the body.

According to one aspect, the second portion tube comprises a second area not overmolded by the part of the body, and this second area comprises a resistance-limiting shape suitable for limiting the resistance of the second portion tube by reducing its length in the longitudinal direction Y during an external stress exceeding a limit value.

According to one aspect, the resistance-limiting shape is composed of corrugations or openings able to be compressed in the longitudinal direction Y so as to reduce the length of the second area of the second portion tube.

According to one aspect, the openings are elongate in a direction perpendicular to the longitudinal direction Y and/or in a direction parallel to the longitudinal direction Y.

According to one aspect, the crossmember further comprises a mounting bracket with a connecting piece slidably mounted on the body of the second portion.

Furthermore, a second object of the invention relates to a vehicle comprising a crossmember corresponding to the characteristics mentioned above.

Furthermore, a third object of the invention relates to a set comprising:
  a first crossmember and a second crossmember in accordance with the characteristics mentioned above,
  the first crossmember comprising a first portion comprising a first portion tube, and a second portion,
  the second crossmember comprising a first portion comprising a first portion tube, and a second portion,
  wherein the first portion tube of the first crossmember has a different length than the first portion tube of the second crossmember, and
  wherein the second portion of the first crossmember is identical to the second portion of the second crossmember.

BRIEF DESCRIPTION OF THE DRAWINGS

Other features and advantages of the invention will become apparent during the following description of one of its embodiments, given by way of non-limiting example, with reference to the appended drawings. In the drawings.

In the various figures, the same reference numbers designate identical or similar elements. The longitudinal direction of the crossmember is designated by the letter Y. The three perpendicular spatial directions are designated by the letters X-Y-Z as is the convention for positional identification in various perspective figures.

DETAILED DESCRIPTION

Figure 1:
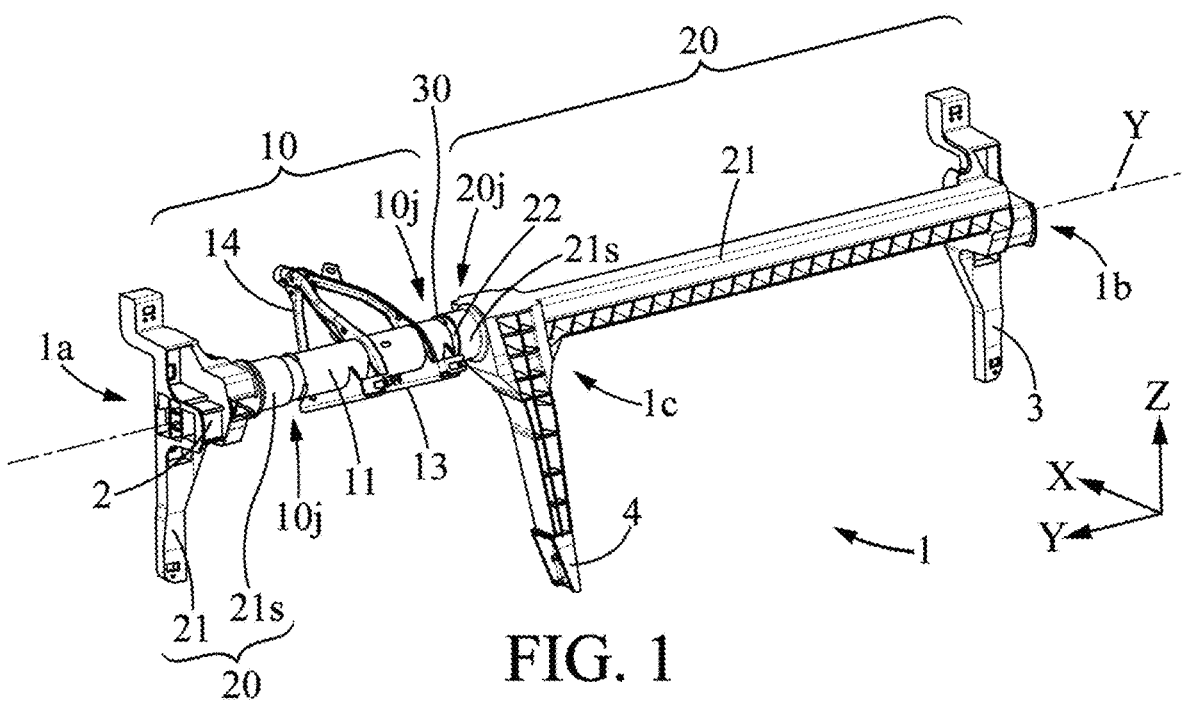
FIG. 1 is a perspective view of a crossmember according to this disclosure.

FIG. 1 represents a crossmember 1 of a motor vehicle dashboard, intended to be fixed transversely between the front side pillars, or "A" pillars, of a vehicle body structure. Crossmember 1 has the function of stiffening the structure of the vehicle and of supporting vehicle equipment such as a steering column, a ventilation system, or a radio. Crossmember 1 has substantially an elongate shape which extends in a longitudinal direction Y.

Crossmember 1 Comprises:
a driver's side mounting bracket 2 at a first end 1a of said crossmember, and
a passenger's side mounting bracket 3 at a second end 1b of the crossmember, second end 1b being opposite to first end 1a in longitudinal direction Y.

Driver's side mounting bracket 2 is adapted to connect crossmember 1 to the vehicle body structure on the driver's seat side of the vehicle. Passenger's side mounting bracket 3 is also adapted to connect crossmember 1 to the body structure of the vehicle, on the opposite side, meaning on the passenger's seat side of the vehicle.

Furthermore, crossmember 1 may comprise an intermediate mounting bracket 4 extending vertically downwards from an intermediate area 1c, in order to be connected to the body structure and/or the floor of the vehicle, so as to increase the rigidity of said body structure and/or the floor of the vehicle, once crossmember 1 is rigidly mounted on the body structure and/or floor of the vehicle.

Crossmember 1 then Comprises:
a first portion 10 which extends in longitudinal direction Y to at least one coupling end 10j of first portion 10, and
a second portion 20 which extends in longitudinal direction Y from a coupling end 20j of second portion 20, coupling end 20j of second portion 20 being suitable for securing to coupling end 10j of first portion 10, to form crossmember 1.

The coupling or connection between first portion 10 and second portion 20 is therefore carried out in a coupling area by the connection of coupling end 10j of first portion 10 to coupling end 20j of second portion 20.

As illustrated, first portion 10 is for example located facing the driver's seat of the vehicle. First portion 10 of crossmember 1 is thus intended to accommodate the steering column and it undergoes more stress mechanically than second portion 20.

First portion 10 comprises a first portion tube 11 made of metal. For example, this metal is steel, aluminum, or another metal. First portion 10 can comprise other elements, metal or not, fixed to first portion tube 11. For example, as shown in the figures, first portion 10 can comprise a steering column support 13 or one or more arms or flanges 14 intended to be connected to other elements of the vehicle body structure in order to stiffen crossmember 1 and/or control deformation of the crossmember and/or other elements of the vehicle body structure during a crash of the vehicle.

Second portion 20 comprises a body 21 made of plastic. For example, this plastic is for example a thermoplastic, or a thermosetting material. Optionally, this material is a composite plastic, including a reinforcing filler such as glass or carbon fibers, for example up to 60%. Second portion 20 may comprise other elements, plastic or not, fixed to body 21. The plastic profile comprises for example a cross-section (perpendicular to the longitudinal direction, i.e. in an X-Z plane) having a shape that is substantially "S"-shaped.

Body 21 of second portion 20 is for example made by plastic molding, for example by injection. Body 21 of second portion 20 is for example a plastic profile comprising a plurality of reinforcing ribs 21n which extend for example in direction X for demolding along this direction X and for increasing the rigidity of this body 21 made of plastic.

Second portion 20 is for example a single piece. In this case, second portion 20 is integrally secured to one end of first portion 10 to form crossmember 1.

Figure 2:
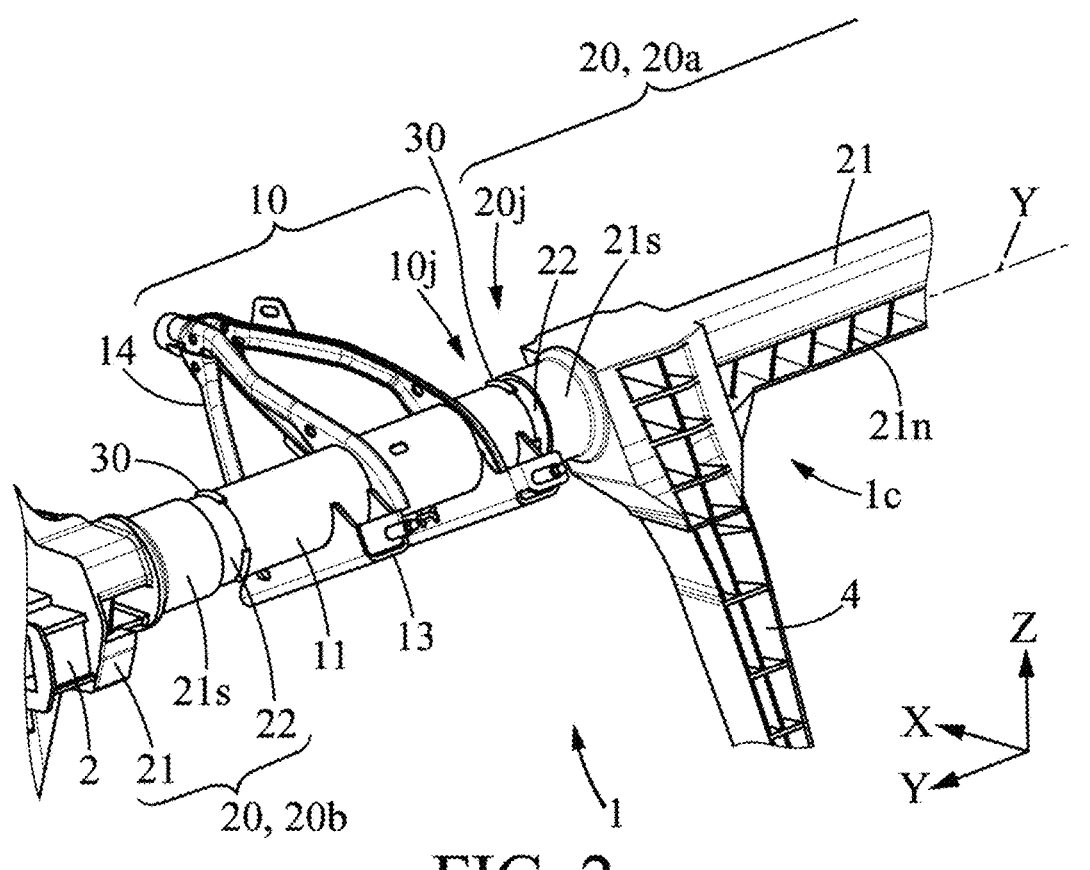
FIG. 2 is an enlarged view of the coupling area of the crossmember of FIG. 1.

Second portion 20 is possibly composed of two pieces 20a and 20b, as shown in FIGS. 1 and 2. In this case, each piece of second portion 20 is integrally secured to one of the ends of first portion 10. First portion 10 is then located between first piece 20a and second piece 20b of second portion 20. Thus, first piece 20a of second portion 20 is connected to a first end of first portion 10, and a second end of first portion 10 is connected to second piece 20b of second portion 20, to form crossmember 1.

First portion 10 and second portion 20 are aligned along longitudinal direction Y, for example rectilinearly: so as to have a single rectilinear axis from first end 1a of crossmember 1 to second end 1b of crossmember 1.

Optionally, first portion 10 and second portion 20 have one or more curved parts; and first and second portions 10, 20 are only aligned in the vicinity of the coupling ends. Crossmember 1 thus assembled then has the intended curved shape for the assembly of first and second portions 10, 20.

The coupling of first piece 20a to first portion 10 and the coupling of second piece 20b to first portion 10 are similar or identical. For simplicity and clarity, we therefore will describe only a first coupling, its provisions easily applied by symmetry.

In particular, according to the embodiment presented in FIGS. 1 and 2, first piece 20a of second portion 20 includes passenger's side mounting bracket 3 and intermediate mounting bracket 4. In this example they are integrated into body 21 of second portion 20, and made for example as one piece, for example by molding this piece, in particular by injection. Similarly, second part 20b of second portion 20 includes driver's side mounting bracket 2, integrated into body 21 of second portion 20, for example by molding this piece. Thus, in general, any mounting bracket 2, 3, 4 can be integrated into the molding of second portion 20.

Of course, mounting brackets 2, 3, 4 can also themselves be constructed by the assembling of one or more pieces. For example, one or more of mounting brackets 2, 3, 4 can comprise a connecting piece extending from the molded part of second portion 20 (body 21) and suitable for attachment to the vehicle body structure and/or or the floor. For example, this connecting piece is made of metal.

Optionally, the connecting piece of mounting bracket 2, 3, 4 is slidably mounted on body 21 of second portion 20, then is fixed to body 21 by any attachment member. One or more screws or one or more rivets or one or more suitable welds can be used as the attachment member. By means of this arrangement, the height of the mounting bracket can be adapted to the vehicle and in particular it is possible to keep the same mold for forming second portion 20 for a plurality of heights of mounting brackets. By means of this arrangement, a single mold can be used for a plurality of references of crossmembers 1 having different heights of mounting brackets. It is thus possible to increase the use of the plastic mold, improve its depreciation, and reduce the cost of the crossmember 1.

Crossmember 1 According to this Disclosure Also has the Following Features:

coupling end 20$j$ of second portion 20 comprises a second portion tube 22 made of metal, this second portion tube 22 being overmolded by a part 21$s$ of body 21 such that second portion tube 22 is integral with body 21, and first portion tube 11 is welded to second portion tube 22 so that first and second portions (10, 20) are integral with each other.

Part 21$s$ of body 21 has for example an annular shape, which at least partially surrounds second portion tube 22 at coupling end 20$j$ of second portion 20.

In other words, first portion 10 is essentially formed of a first portion tube 11 made of metal, while second portion 20 is essentially formed of a body 21 made of plastic. Thus, to connect second portion 20 to first portion 10, a second portion tube 22 is molded at least partially over body 21 of second portion 20. This overmolding makes it possible to integrally secure second portion tube 22 to body 21 of second portion 20.

In addition, second portion tube 22 is made of a metal capable of being welded to first portion tube 11. First portion tube 11 and second portion tube 22 advantageously have the same cross-section in the directions of the X-Z plane, so that the ends of these tubes can be welded together.

Weld 30 between first portion tube 11 and second portion tube 22 is for example a continuous weld which surrounds the periphery of the ends of said tubes. Alternatively, weld 30 can be composed of several weld line segments distributed along the periphery of the ends of said tubes. It is possible that only a few spot welds are made along the periphery of the ends of said tubes.

As a variant, first portion tube 11 has a cross-section with a diameter greater than or less than the diameter of the cross-section of second portion tube 22. The coupling of the two tubes can then for example be performed by fitting one into the other. In this case, the weld is for example made along the periphery of a cross-section and/or along the tangential direction relative to longitudinal direction Y. The coupling of the tubes is then improved.

The length of crossmember 1 can be adapted in the longitudinal direction, for example by choosing a length of first portion 10; in other words by choosing a length of first portion tube 11. The length in the longitudinal direction of second portion 20 can be maintained, and in particular the same mold for shaping second portion 20 can be retained for a plurality of lengths of crossmember 1. By means of this arrangement, a single mold can be used for a plurality of references of crossmembers 1 having different lengths, these crossmembers of different lengths being for example intended to be mounted on vehicles of different widths. It is thus possible to increase the use of the plastic mold, improve its depreciation, and reduce the cost of crossmember 1.

Figure 3:
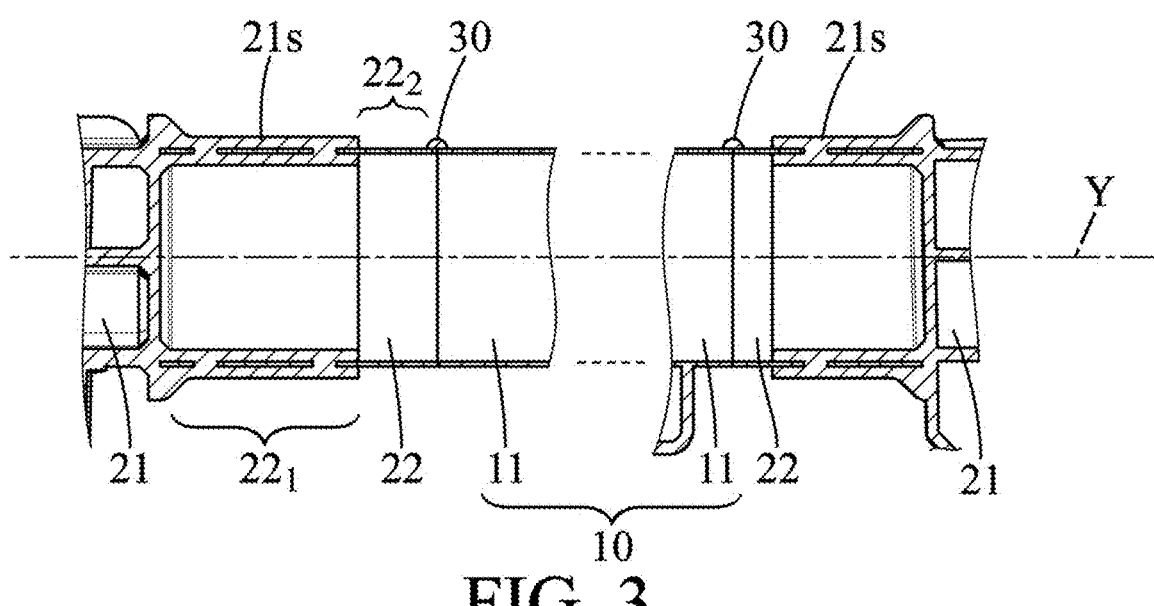
FIG. 3 is a section view of the coupling area of the crossmember of FIG. 1.

FIG. 3 is a section view of crossmember 1, showing more clearly the overmolding of second portion tube 22 by part 21$s$ of body 21 of second portion 20. Part 21$s$ of body 21 has for example an annular shape, which at least partially surrounds second portion tube 22 at coupling end 20$j$ of second portion 20.

In particular, part 21$s$ of body 21 covers a first area 22$_1$ of second portion tube 22, and leaves uncovered a second area 22$_2$ of said tube. The interface surface between part 21$s$ and second portion tube 22 in first area 22$_1$ makes it possible to secure these two parts firmly together. The length of second area 22$_2$ in longitudinal direction Y makes it possible to create weld 30 without affecting the quality of the connection of part 21$s$ located in first area 22$_1$. Second area 22$_2$ is therefore not overmolded/covered by part 21$s$ of body 21.

Second portion tube 22 has a cylindrical shape. This tube is possibly created by rolling and welding a sheet, or by forming a sheet, or by extrusion of material.

Figure 4:
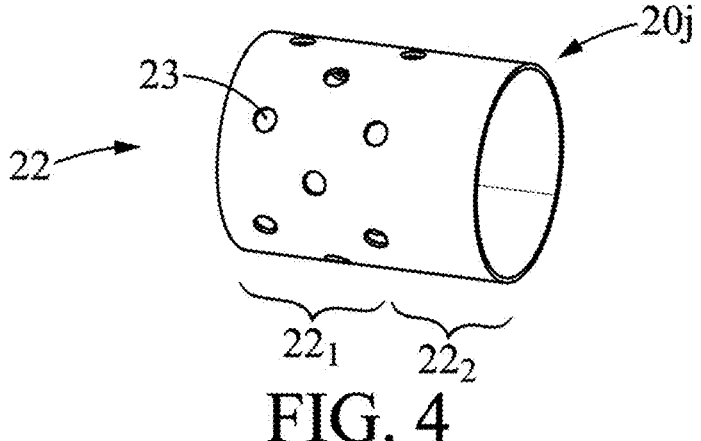
FIG. 4 is a perspective view of a first variant of the second portion tube of the crossmember.

According to a first variant illustrated in FIG. 4, second portion tube 22 comprises holes 23 in first area 22$_1$ of said tube. Thus, the overmolding material of part 21$s$ of body 21 enters holes 23 during plastic injection of second portion 20. The connection between part 21$s$ and second portion tube 22 is then much more resistant to mechanical stress.

Holes 23 can be cylindrical or oblong or have any other shape. In particular, these holes can have an elongate shape in longitudinal direction Y or in a direction perpendicular to or inclined relative to longitudinal direction Y. It is thus possible to adjust the mechanical strength of the connection of part 21$s$ to second portion tube 22.

The shape and number of the holes are adapted to the desired resistance characteristic of the connection between body 21 and second portion tube 22.

Figure 5:
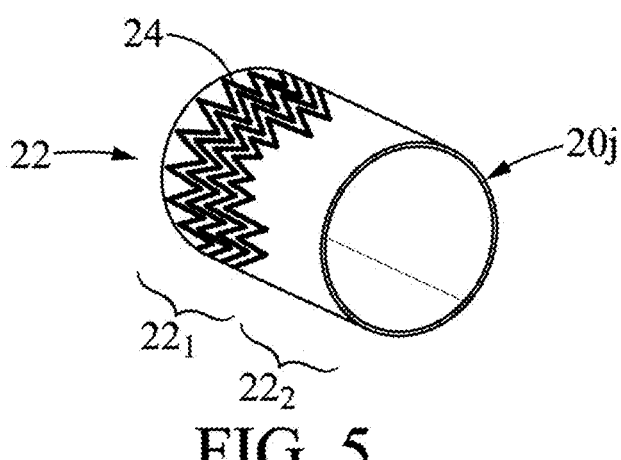
FIG. 5 is a perspective view of a second variant of the second portion tube of the crossmember.

According to a second variant illustrated in FIG. 5, second portion tube 22 comprises striations or a texturing 24 of its external surface intended to be in contact with part 21$s$. Thus, the overmolding material of part 21$s$ of body 21 closely follows the contours of these striations or texturing 24 during plastic injection of second portion 20. The connection between part 21$s$ and second portion tube 22 is then much more resistant to mechanical stress.

It is possible to combine the above two variants to adjust the mechanical strength of the connection and to optimize the piece in terms of size and/or cost.

Figure 6:
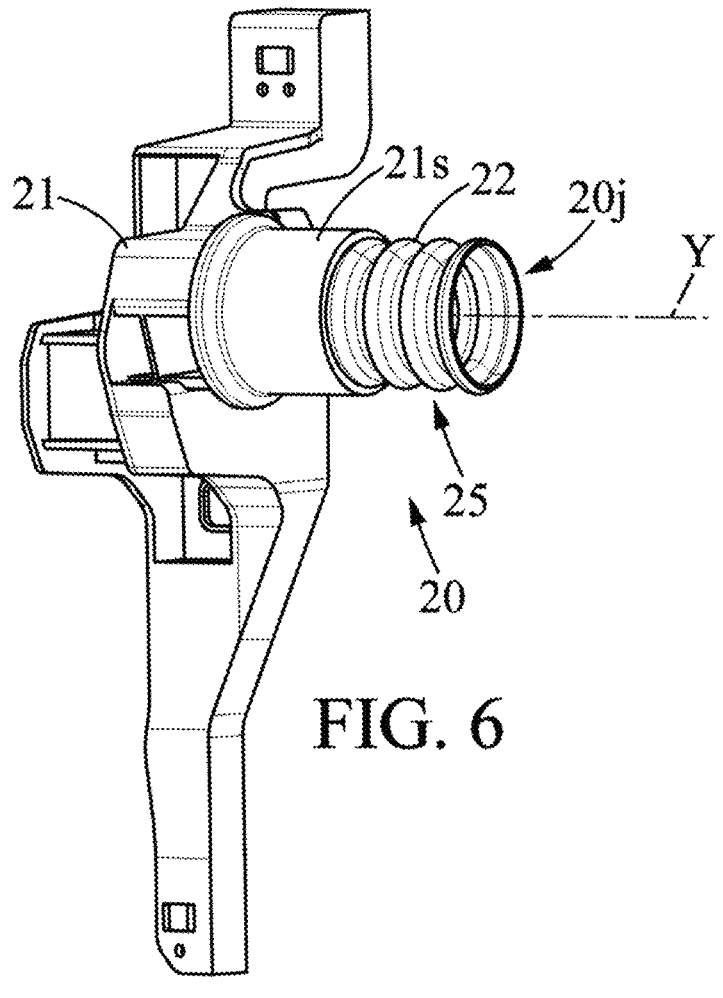
FIG. 6 is a perspective view of a second embodiment of a second portion of the crossmember, with another variant of the second portion tube.
Figure 7:
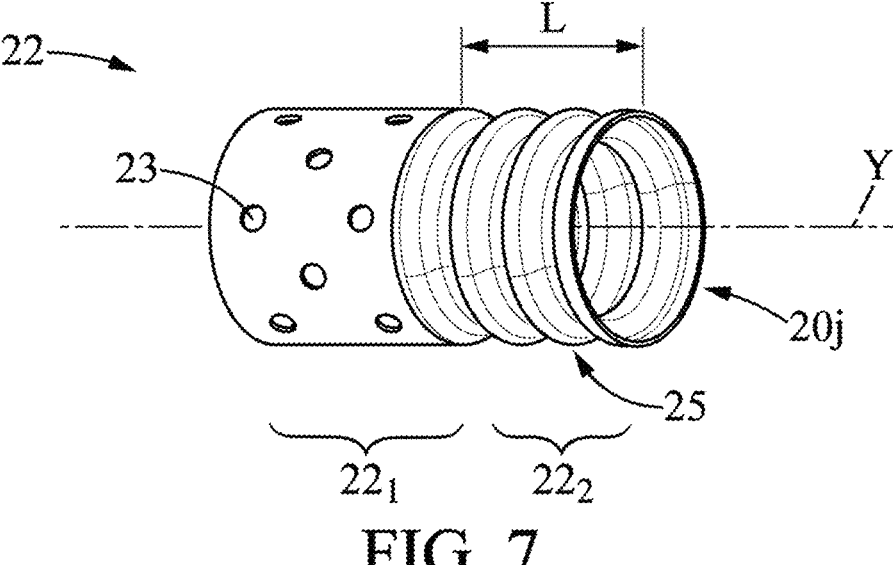
FIG. 7 is a perspective view of the second portion tube of FIG. 6.

According to a second embodiment of the crossmember, illustrated in FIGS. 6 and 7, second portion tube 22 comprises a second area 22$_2$ having a resistance-limiting shape in longitudinal direction Y. The resistance-limiting shape of this embodiment is adapted to limit the resistance of second portion tube 22 when stressed by mechanical compression in longitudinal direction Y, for example during a vehicle impact. In such an impact, second area 22$_2$ of second portion 22 of second portion 22 is capable of deforming and/or compressing in longitudinal direction Y when a force in this direction is greater than a predetermined threshold. Thus, length L in longitudinal direction Y of second area 22$_2$ of second portion 22 can be reduced under the action of the impact, to absorb part of the impact energy during said deformation and/or compression. This situation arises for example during a side impact of the vehicle.

The resistance-limiting shape of this embodiment of FIGS. 6 and 7 is composed of a plurality of corrugations 25 made in longitudinal direction Y of second area 22$_2$ of second portion tube 22. These corrugations 25 therefore form rings that surround longitudinal direction Y, successively in this direction.

Corrugations 25 are therefore capable of being compressed in longitudinal direction Y during an impact, to shorten length L of second area 22$_2$.

The amplitude in a radial direction X-Z, the spacing in longitudinal direction Y, and the number of undulations 25 of second area 22$_2$ of second portion tube 22, make it possible to adjust the resistance of this piece (force or curve of force as a function of deformation). For example, a resistance limit value of second portion tube 22 can be predetermined by the characteristics of these corrugations; beyond this limit value, second portion tube 22 will shorten to absorb some of the energy of an impact or force.

Figure 8:
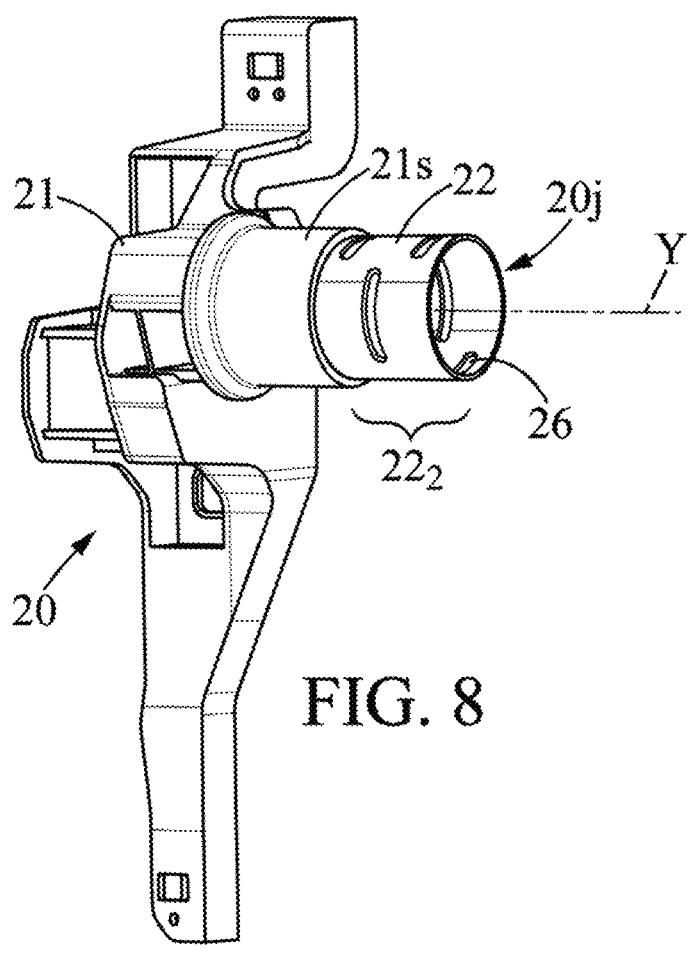
FIG. 8 is a perspective view of a third embodiment of a second portion of the crossmember, with another variant of the second portion tube.
Figure 9:
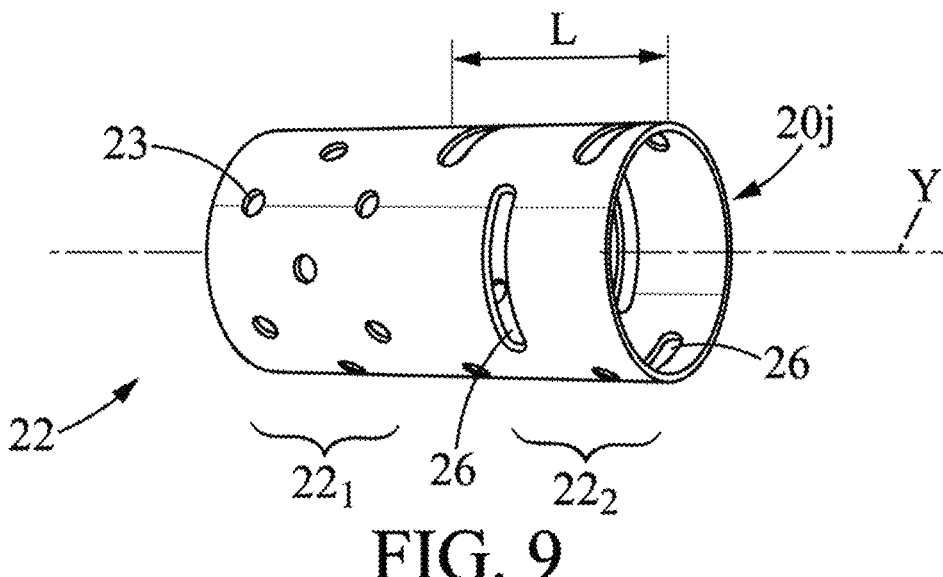
FIG. 9 is a perspective view of the second portion tube of FIG. 6.

According to a third embodiment of the crossmember, illustrated in FIGS. 8 and 9, second portion tube 22 comprises a second area $22_2$ having another resistance-limiting shape in longitudinal direction Y. This other resistance-limiting shape of this embodiment has the same function of limiting the resistance of second portion tube 22 during an impact of the vehicle. Length L in longitudinal direction Y of second area $22_2$ of second portion 22 can be reduced under the action of the impact.

The resistance-limiting shape of this embodiment of FIGS. 8 and 9 is composed of a plurality of openings 26 created in second area $22_2$ of second portion tube 22. These openings 26 are therefore able to compress or close in longitudinal direction Y during an impact, to shorten length L of second area $22_2$.

The size and number of openings 26 of second area $22_2$ of second portion tube 22 allow adjusting the resistance limit value of this piece; beyond this limit value, second portion tube 22 will shorten in order to absorb some of the energy of an impact.

According to the variant shown in FIG. 9, openings 26 are elongate in a direction perpendicular to longitudinal direction Y.

However, depending on the desired resistance adjustment (force or curve of force as a function of deformation), openings 26 are either elongate in a direction perpendicular to longitudinal direction Y, or elongate in a direction parallel to longitudinal direction Y, or composed of a predetermined combination of openings along one or the other of the directions, or with more complex shapes predetermined by calculations and/or tests. Thus, as explained above for corrugations 25, openings 26 allow adjusting a resistance limit value beyond which second portion tube 22 will shorten to absorb some of the energy of the impact or force.

According to other embodiments of crossmember 1, second portion tube 22 comprises a second area $22_2$ combining the previously described corrugations 25 and openings 26. According to other embodiments of crossmember 1, second portion tube 22 comprises a second area $22_2$ comprises shapes (corrugations, openings, or other) adapted to obtain a desired resistance adjustment (force or force curve). In particular, these adapted shapes are dimensioned by calculation and/or by tests so as to obtain a resistance limit value before deformation.

Finally, according to another embodiment of the crossmember, steering column support 13 or a part of steering column support 13 is overmolded by a portion of crossmember 1. For example, a part of steering column support 13 is overmolded by first portion tube 11. The steering column support or the part of the steering column support is made of metal.

The various embodiments of crossmember 1 are therefore usable in many vehicles.

In particular, it is possible to create a set of crossmembers (two crossmembers: a first crossmember and a second crossmember) with first portion tubes of different lengths, and identical second portions. Thus, by adapting the lengths of the metal first portion tubes, it is possible to produce crossmembers of different lengths on the same machine, therefore for different vehicles for example.

The invention claimed is:

1. A vehicle crossmember extending in a longitudinal direction and including:
    a first portion comprising a first portion tube made of metal, said first portion extending in the longitudinal direction towards a coupling end of the first portion,
    a second portion comprising a body made of plastic, said second portion extending in the longitudinal direction from a coupling end of the second portion, the coupling end of the second portion being suitable for securing to the coupling end of the first portion,
    wherein the coupling end of the second portion comprises a second portion tube made of metal, said second portion tube being overmolded by only a part of the body such that the second portion tube is integral with said body, and the first portion tube is welded to the second portion tube so that the first and second portions are integral with each other.

2. The vehicle crossmember according to claim 1, wherein the second portion tube comprises a first area over which the part of the body is molded, and the first area comprises holes which are entered by the material of the part of the body.

3. The vehicle crossmember according to claim 2, wherein the holes are elongate in a predetermined direction.

4. The vehicle crossmember according to claim 1, wherein the second portion tube comprises a first area over which the part of the body is molded, and the first area comprises texturing on its outer surface covered by the material of the part of the body.

5. A vehicle crossmember extending in a longitudinal direction and including:
    a first portion comprising a first portion tube made of metal, said first portion extending in the longitudinal direction towards a coupling end of the first portion,
    a second portion comprising a body made of plastic, said second portion extending in the longitudinal direction from a coupling end of the second portion, the coupling end of the second portion being suitable for securing to the coupling end of the first portion,
    wherein the coupling end of the second portion comprises a second portion tube made of metal, said second portion tube being overmolded by a part of the body such that the second portion tube is integral with said body, and the first portion tube is welded to the second portion tube so that the first and second portions are integral with each other,
    wherein the second portion tube comprises a second area not overmolded by the part of the body, and the second area comprises a resistance-limiting shape suitable for limiting the resistance of the second portion tube by reducing its length in the longitudinal direction during an external stress exceeding a limit value.

6. The vehicle crossmember according to claim 5, wherein the resistance-limiting shape is composed of at least one among corrugations and openings able to be compressed in the longitudinal direction so as to reduce the length of the second area of the second portion tube.

7. The vehicle crossmember according to claim 6, wherein the openings are elongate in a direction perpendicular to the longitudinal direction and/or in a direction parallel to the longitudinal direction.

8. The vehicle crossmember according to claim 1, further comprising a mounting bracket with a connecting piece slidably mounted on the body of the second portion.

9. A vehicle comprising the vehicle crossmember according to claim 1.

10. A set comprising:

first and second vehicle crossmembers in accordance with claim 1, the first vehicle crossmember comprising a first portion comprising a first portion tube, and a second portion, the second vehicle crossmember comprising a first portion comprising a first portion tube, and a second portion, wherein the first portion tube of the first vehicle crossmember has a different length than the first portion tube of the second vehicle crossmember, and wherein the second portion of the first vehicle crossmember is identical to the second portion of the second vehicle crossmember.

11. The vehicle crossmember according to claim 1, wherein the second portion tube is overmolded by only a part of a length of the body.

12. A vehicle comprising the vehicle crossmember according to claim 5.

13. A set comprising:

first and second vehicle crossmembers in accordance with claim 5, the first vehicle crossmember comprising a first portion comprising a first portion tube, and a second portion, the second vehicle crossmember comprising a first portion comprising a first portion tube, and a second portion, wherein the first portion tube of the first vehicle crossmember has a different length than the first portion tube of the second vehicle crossmember, and wherein the second portion of the first vehicle crossmember is identical to the second portion of the second vehicle crossmember.

14. A vehicle crossmember extending in a longitudinal direction and including:

a first portion comprising a first portion tube made of metal, said first portion extending in the longitudinal direction towards a coupling end of the first portion, a second portion comprising a body made of plastic, said second portion extending in the longitudinal direction from a coupling end of the second portion, the coupling end of the second portion being suitable for securing to the coupling end of the first portion, wherein the coupling end of the second portion comprises a second portion tube made of metal, said second portion tube being overmolded by a part of the body such that the second portion tube is integral with said body, wherein a length of the second portion tube is less than a length of the second portion, and the first portion tube is welded to the second portion tube so that the first and second portions are integral with each other.

15. A vehicle comprising the vehicle crossmember according to claim 14.

16. A set comprising:

first and second vehicle crossmembers in accordance with claim 14, the first vehicle crossmember comprising a first portion comprising a first portion tube, and a second portion, the second vehicle crossmember comprising a first portion comprising a first portion tube, and a second portion, wherein the first portion tube of the first vehicle crossmember has a different length than the first portion tube of the second vehicle crossmember, and wherein the second portion of the first vehicle crossmember is identical to the second portion of the second vehicle crossmember.

* * * * *